Sept. 18, 1951     C. M. HOLDER ET AL     2,568,005
DRILL PIPE ATTACHMENT
Filed March 8, 1950     2 Sheets-Sheet 1
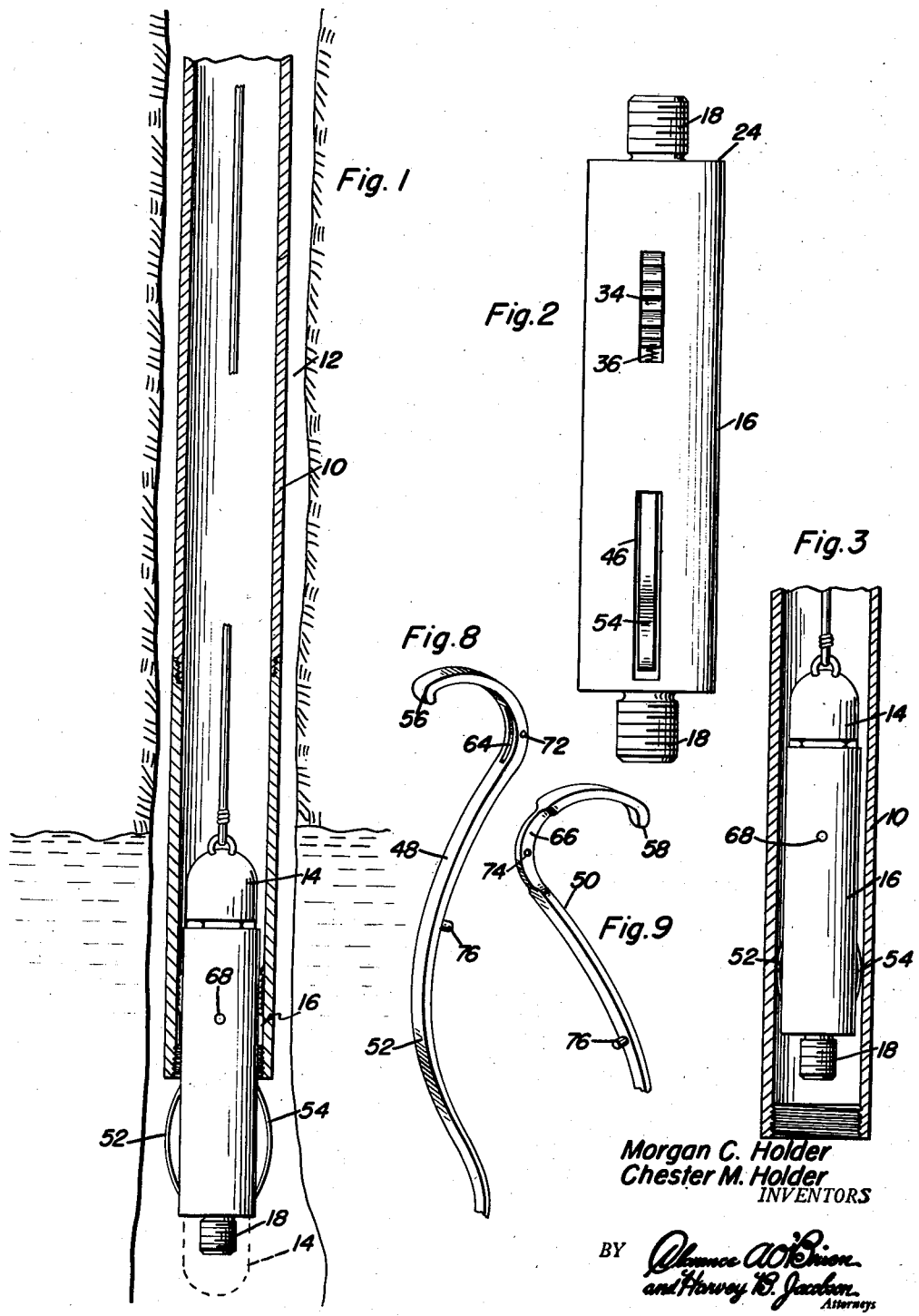
Morgan C. Holder
Chester M. Holder
INVENTORS Sept. 18, 1951   C. M. HOLDER ET AL   2,568,005
DRILL PIPE ATTACHMENT Filed March 8, 1950   2 Sheets-Sheet 2

Morgan C. Holder
Chester M. Holder
INVENTORS

BY *Clarence A. O'Brien*
*and Harvey B. Jacobson*
Attorneys

Patented Sept. 18, 1951

2,568,005

UNITED STATES PATENT OFFICE 2,568,005

DRILL PIPE ATTACHMENT

Chester M. Holder and Morgan C. Holder,
Ringling, Okla.

Application March 8, 1950, Serial No. 148,428

4 Claims. (Cl. 255—1)

This invention relates to an attachment for any body slidable in a pipe or tube the primary object of which is to prevent the body from accidentally dropping out of the bottom edge of the tube.

In the art of drilling, it is customary to slide an instrument such as a camera or recording machine into a drill pipe. Should the cables carrying the instrument or the pipe break off accidentally the instrument will fall out of the pipe. The present device has been designed and constructed to prevent this accidental falling out of the instrument.

Another object of the invention is to provide a device of the character described which is relatively simple in construction and assembly, easy to attach to a sliding body, and automatic in its operation.

Yet another object of the invention is to provide in combination with an object slidably positioned in a tube, a device for preventing the object from dropping out of the end of the tube comprising a cylindrical body, means for attaching the body to the object, tube gripping members carried by said body, resilient means normally urging said members outwardly of said body and into gripping engagement with the inner wall of the tube, and lever means operatively connected to said gripping members urging said members inwardly and out of gripping contact with said tube by engagement of said lever means with the inner wall of said tube.

These, together with various ancillary objects and features of the invention which will later become apparent as the following description proceeds, are attained by the device, a preferred embodiment of which has been illustrated by way of example only on the accompanying drawings, wherein:

Figure 1 is a side elevational view of the device shown attached to an instrument in a drill pipe;

Figure 2 is a side elevational view of the device itself looking from the left on Figure 1;

Figure 3 is a view similar to Figure 1 showing the device in a sliding or inoperative position;

Figures 8 and 9 are perspective views of the levers for actuating the grips.

Specific reference is now made to the drawings. In the several views in the accompanying drawings and in the following specification reference characters indicate corresponding elements throughout.

Figure 4:
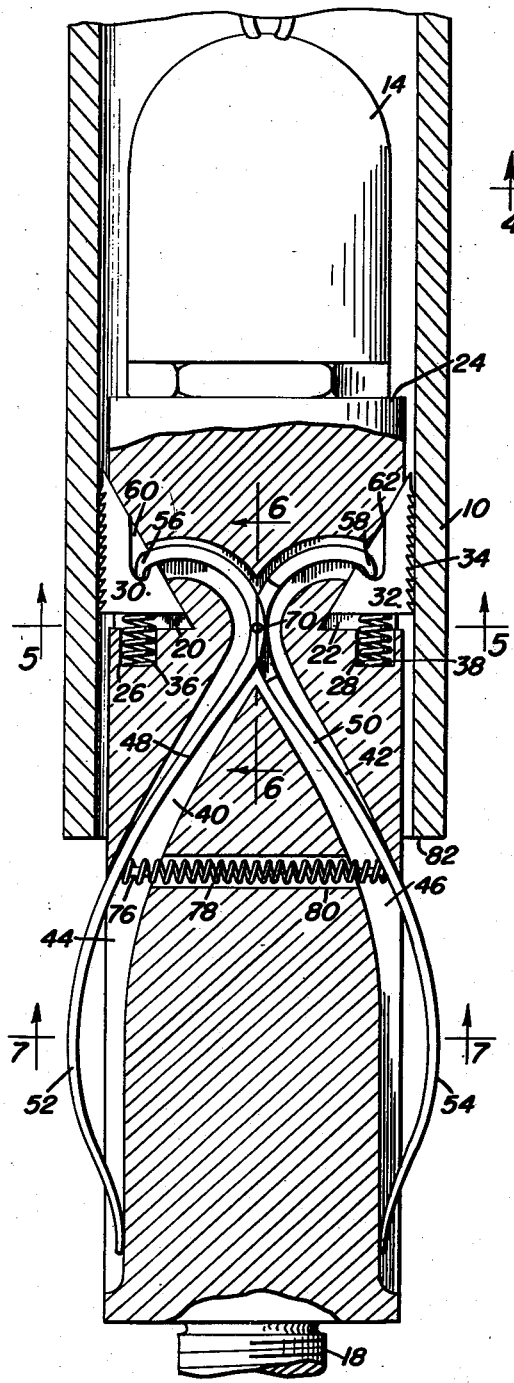
Figure 4 is a sectional view taken on the line 4—4 of Figure 5.
Figure 5:
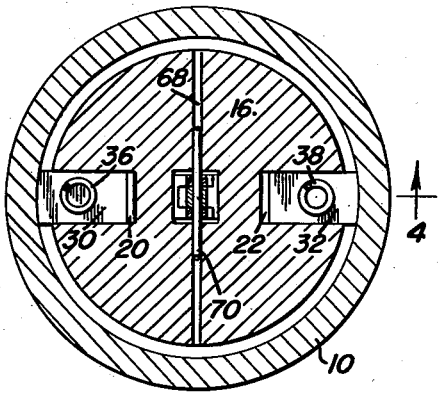
Figure 5 is a sectional view taken on the line 5—5 of Figure 4.
Figure 6:
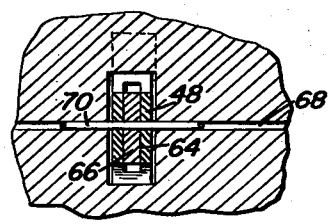
Figure 6 is a sectional view taken on the line 6—6 of Figure 4.
Figure 7:
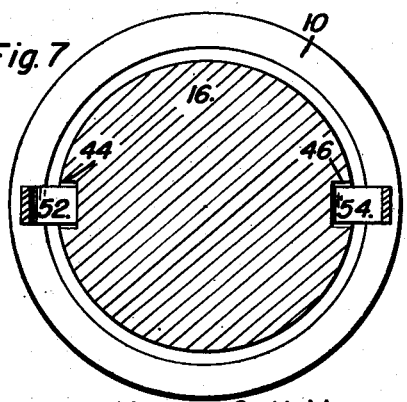
Figure 7 is a sectional view taken on the line 7—7 of Figure 4.

Indicated generally at 10 is a drill pipe shown positioned in a well 12. Slidable in the pipe is an instrument 14, such as a camera or recording device, to which the device 16 of the present invention may be attached. The device includes a cylindrical body of diameter less than the pipe having threaded extensions 18 for detachably securing the body to the instrument.

The cylindrical body includes diametrically opposed, right triangular recesses 20 and 22 adjacent the upper end 24 thereof, the body including vertical wells 26 and 28 entering into the recesses. Slidable in the recesses are right triangular blocks 30 and 32 each having teeth 34 adapted to grippingly engage the inner face of the pipe 10. Coil springs 36 and 38 are received in the wells and abut the bases of the gripping blocks normally urging them upwardly and outwardly of the body and into gripping engagement with the pipe.

The cylindrical body is provided with diametrically opposed, relatively wide S-shaped slots 40 and 42 portions of which extend through the wall of the body as at 44 and 46. A pair of S-shaped lever arms 48 and 50 are received in the slots, the arms having relatively long bowed portions 52 and 54 adapted to extend through the slot portions 44 and 46. The construction of the lever arms are shown in Figures 8 and 9, and it will be seen that the arms have hook portions 56 and 58 at their upper ends which are received in slots 60 and 62 in the gripping blocks 30 and 32, the slots extending through the hypotenuse of said blocks. The arm 48 has an arcuate slot 64 for receiving a reduced portion 66 in the other arm 50. The body 16 is provided with a diagonal recess 68 which receives a pin 70 that extends through aligned apertures 72 and 74 in the arms 48 and 50. Thus the lever arms are pivoted intermediate their ends on the pin 70. The lever arms are provided with lugs 76 which receive the ends of a coil spring 78 which is interposed between the lever arms, the spring extending through a transverse bore 80 in the body 16. The spring normally urges the lever arms apart.

In practical operation, the body 16 is attached to an instrument 14 via the threaded lugs 18. As the body slides through the pipe 10, the wall of the pipe presses against the portions 52 and 54 of the lever arms urging them inwardly against action of the spring 78. As the lever arms move inwardly, the hooked ends 56 and 58 press downwardly on the gripping blocks moving them inwardly and away from the wall of the pipe. When the portions 52 and 54 of the lever arms clear the bottom free edge 82 of the pipe, the spring 78 forces the lever arms outwardly whereupon the hooked ends 56 and 58 allow the gripping blocks to move upwardly and outwardly of the block and into gripping engagement with the inner wall of the pipe preventing falling out or loss of the instrument 14.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with an object slidably positioned in a tube, a device for preventing the object from dropping out of the end of the tube comprising a cylindrical body, means for attaching the body to the object, tube gripping means carried by said body, resilient means normally urging said members outwardly of said body and into gripping engagement with the inner wall of the tube, and lever means operatively connected to said gripping members urging said members inwardly and out of gripping contact with said tube by engagement of said lever means with the inner wall of said tube, said lever means including S-shaped arms having hooked upper ends pivoted intermediate their ends, said gripping members including slots receiving the upper ends of said arms, said hooked upper ends urging said gripping members inwardly of said body upon compression of said arms by said tube.

2. The combination of claim 1 and a resilient means between said arms beneath the pivot normally urging said arms apart.

3. The combination of claim 2 wherein said body includes diagonally opposed right-triangular recesses adjacent its upper end, said gripping members including right-triangular blocks slidable in said recesses, said blocks having gripping teeth.

4. The combination of claim 3 wherein said resilient means includes coil springs retained in said body each abutting the base of each gripping block.

CHESTER M. HOLDER.
MORGAN C. HOLDER.

REFERENCES CITED

The following references are of record in the file of this patent:

UNITED STATES PATENTS

| Number | Name | Date |
|---|---|---|
| 1,218,549 | Guiberson, Jr. | Mar. 6, 1917 |
| 2,193,183 | Watts | Mar. 12, 1940 |
| 2,251,125 | Gardner | July 29, 1941 |